(12) United States Patent
Engel

(10) Patent No.: US 8,419,501 B2
(45) Date of Patent: Apr. 16, 2013

(54) APPARATUS FOR CONTINUOUS WEIGHT MONITORING OF BEEHIVES

(76) Inventor: Stephen Engel, Sacramento, CA (US)

( * ) Notice: Subject to any disclaimer, the term of this patent is extended or adjusted under 35 U.S.C. 154(b) by 350 days.

(21) Appl. No.: 12/893,138

(22) Filed: Sep. 29, 2010

(65) Prior Publication Data

US 2012/0077413 A1    Mar. 29, 2012

(51) Int. Cl.
*A01K 47/06* (2006.01)
*A01K 47/00* (2006.01)

(52) U.S. Cl.
USPC .................................................. 449/26; 449/3

(58) Field of Classification Search ............ 449/2, 3, 449/6, 26, 50
See application file for complete search history.

(56) References Cited

U.S. PATENT DOCUMENTS

| | | | |
|---|---|---|---|
| 1,535,920 A * | 4/1925 | Jonian | 449/3 |
| 4,346,490 A * | 8/1982 | Katz et al. | 449/2 |
| 6,910,941 B2 * | 6/2005 | Bromenshenk et al. | 449/3 |

FOREIGN PATENT DOCUMENTS

FR      2 594 638   *  8/1987 .................... 449/50

* cited by examiner

*Primary Examiner* — Rob Swiatek
(74) *Attorney, Agent, or Firm* — Kaplan Breyer Schwarz & Ottesen, LLP

(57) ABSTRACT

An apparatus and method for continuously monitoring the weight of an object. The apparatus does not obstruct a central portion of the bottom of the object being monitored, and is especially well-suited for monitoring the weight of a beehive. In the illustrative embodiment, a ring-shaped fluid-filled bladder is sandwiched between a ring-shaped top surface and a ring-shaped base, and a pressure hose connects the bladder to a pressure gauge. Beehive weight data can be obtained in a continuous fashion, without requiring any moving of the beehive or of the apparatus, and without any other type of disruption. Moreover, the apparatus provides a stable platform that keeps the beehive immobile during monitoring, which is beneficial for the health of the colony. Advantageously, the apparatus can be constructed from inexpensive, off-the-shelf components and materials, and is capable of obtaining accurate measurements over a wide range of temperatures and environmental conditions.

10 Claims, 8 Drawing Sheets

ILLUSTRATIVE USE OF WEIGHT-MONITORING SYSTEM 100

APPARATUS FOR CONTINUOUS WEIGHT MONITORING OF BEEHIVES

FIELD OF THE INVENTION

The present invention relates to weight monitoring, and, more particularly, to an apparatus that is particularly well-suited to continuously monitoring the weight of a beehive over time.

BACKGROUND OF THE INVENTION

A beehive is an enclosed structure in which some honey bee species of the subgenus Apis live and raise their young. Natural beehives (typically referred to simply as "nests") are naturally occurring structures occupied by honey bee colonies, while domesticated honey bees live in man-made beehives, often in an apiary. These man-made structures are typically referred to as "beehives." Several species of Apis live in hives, but typically the western honey bee (Apis mellifera) and the eastern honey bee (Apis cerana) are domesticated by humans.

The beehive's internal structure is a densely packed matrix of hexagonal cells made of beeswax, called a honeycomb. The bees use the cells to store food (honey and pollen), and to house the "brood" (eggs, larvae, and pupae).

Artificial beehives serve two purposes: production of honey and pollination of nearby crops. Artificial hives are commonly transported so that bees can pollinate crops in other areas.

For numerous reasons, it is advantageous for beekeepers to monitor the weight of a beehive over time. For example, a rapid increase in the weight of a hive can indicate nectar intake into the hive, while a steady decrease in the weight of a hive can indicate resource consumption and depletion. This information is useful for commercial beekeepers that move their hives to follow nectar flows, as well as for quantifying and forecasting the migration potential of Africanized Honey Bees.

As another example, a sudden decrease in the weight of a hive during springtime can indicate swarming. When a beekeeper becomes aware of swarming, he or she typically introduces his or her preferential mated queen bee to the hive immediately, thereby limiting the time in which a bee colony is without a new, mature egg-laying queen.

Weight data can also be used to predict good versus bad years for honey production, as well as for agricultural crops in general, and to provide insight on colony behavior. In addition, weight data can alert beekeepers to health problems, vandalism, and the need to feed colonies to avert starvation.

SUMMARY OF THE INVENTION

The present invention comprises a weight-monitoring apparatus that does not obstruct the bottom of the object being monitored, and is especially well-suited for continuously monitoring the weight of a beehive. By providing unobstructed access to the area below the bottom board of a beehive, a beekeeper can clear spider webs from this area without moving the beehive or disrupting the weight monitoring. The clearing of spider webs from the vicinity of a beehive is an important periodic activity, as black widows and other types of spiders are predators that often congregate around hives and threaten the bee colony.

The present invention is especially advantageous for monitoring the weight of beehives with a screened bottom board, rather than a solid bottom board. In particular, waste produced in the beehive is free to fall through the bottom board and exit the beehive, rather than collecting in the beehive and potentially becoming home to wax moths and other threats. This results in more accurate measurements, since the weight associated with waste is excluded, as well as a healthier colony. In addition, the present invention provides improved ventilation into and out of the beehive through the screened bottom board, and enables sensors such as video cameras and microphones to be deployed below the screened bottom board and unobtrusively monitor the inside of the beehive.

In accordance with the illustrative embodiment of the present invention, a ring-shaped fluid-filled bladder is sandwiched between a ring-shaped top surface and a ring-shaped base, and a pressure hose connects the bladder to a pressure gauge and an electromagnetic pressure transducer. When a beehive or other object is placed on the top surface, the pressure of the fluid in the bladder increases by an amount that is correlatable to the weight of the beehive and is measured by the pressure gauge and electromagnetic pressure transducer. The pressure gauge enables a person at the beehive to view the current pressure, from which weight can be derived, while readings from the electromagnetic pressure transducer are transmitted to a remote computer and stored as a data time-series for real-time and/or archival analysis. Advantageously, the illustrative embodiment can be constructed from inexpensive, off-the-shelf components and materials, and is capable of obtaining accurate measurements over a wide range of temperatures and environmental conditions.

In accordance with the illustrative embodiment, beehive weight data is obtained in a continuous fashion, without requiring any moving of the beehive or of the monitoring apparatus, and without any other type of disruption. Moreover, the illustrative embodiment provides a stable platform that keeps the beehive level and steady during the monitoring, which is beneficial for the health of the colony.

The illustrative embodiment comprises an apparatus for continuously monitoring the weight of a beehive, the apparatus comprising: a surface for stably supporting the beehive, wherein a marginal portion of a bottom of the beehive is disposed on the surface and a central portion of the bottom of the beehive is not disposed on the surface; a fluid-filled bladder on which the surface is disposed; a base that comprises a channel in which the bladder is disposed; and pressure-measuring means connected to the bladder, wherein a change in pressure measured by the pressure-measuring means is correlatable to a change in the weight of the beehive; wherein the apparatus is physically configured to enable waste produced in the beehive to exit the beehive during the continuous monitoring.

DETAILED DESCRIPTION

Figure 1:
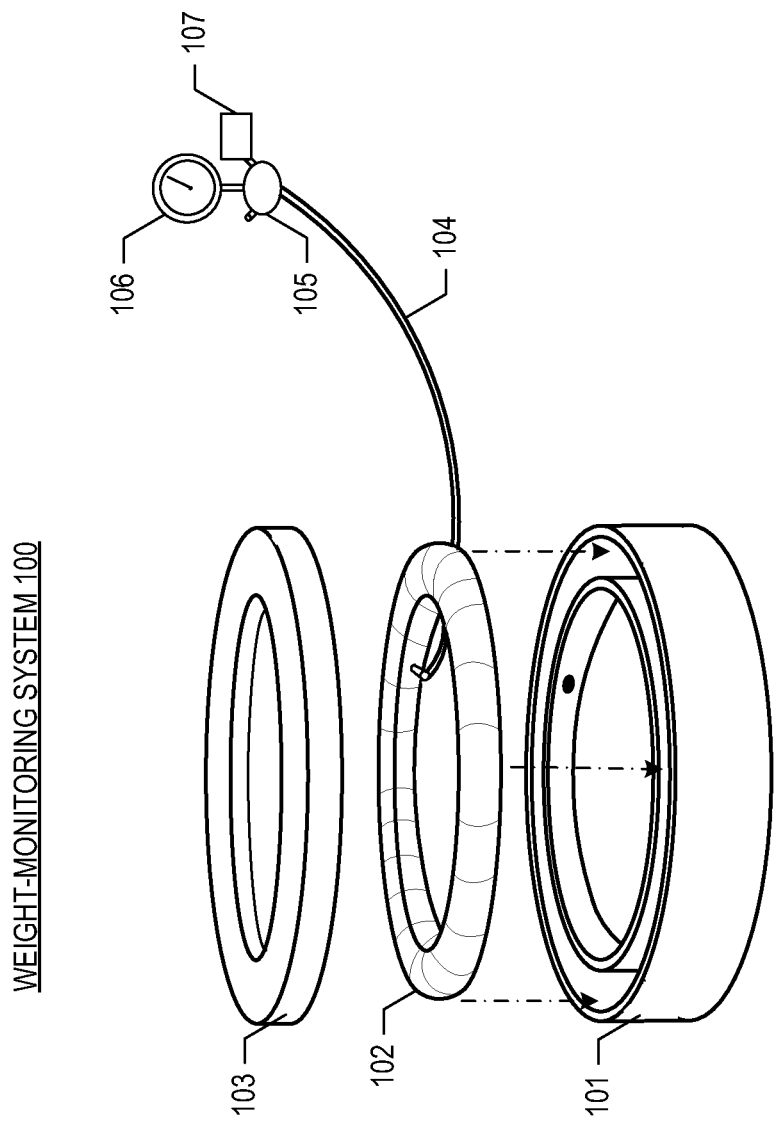
FIG. 1 depicts an exploded diagram of the salient elements of weight-monitoring system 100, in accordance with the illustrative embodiment of the present invention.

FIG. 1 depicts an exploded diagram of the salient elements of weight-monitoring system 100, in accordance with the illustrative embodiment of the present invention. As shown in FIG. 1, weight-monitoring system 100 comprises base 101, fluid-filled bladder 102, top 103, pressure hose 104, manifold 105, pressure gauge 106, and pressure-monitoring system 107.

Bladder 102 is a sealed vessel that is capable of holding liquid and/or gaseous fluids, in well-known fashion, and is sufficiently flexible such that pressure exerted on the exterior of the bladder 102 results in an increase in pressure in the fluid inside the bladder, such that the pressure increase of the fluid is correlatable to the exterior-exerted pressure. In accordance with the illustrative embodiment, bladder 102 is a rubber bicycle inner tube with a thin layer of fiberglass fabric wrapped around the inner tube. As will be appreciated by those skilled in the art, in some other embodiments of the present invention, bladder 102 might be made of some other materials, or might be a specially-constructed vessel expressly for use in the present invention, rather than an "off-the-shelf" vessel that is adapted for use in the present invention.

Figure 5:
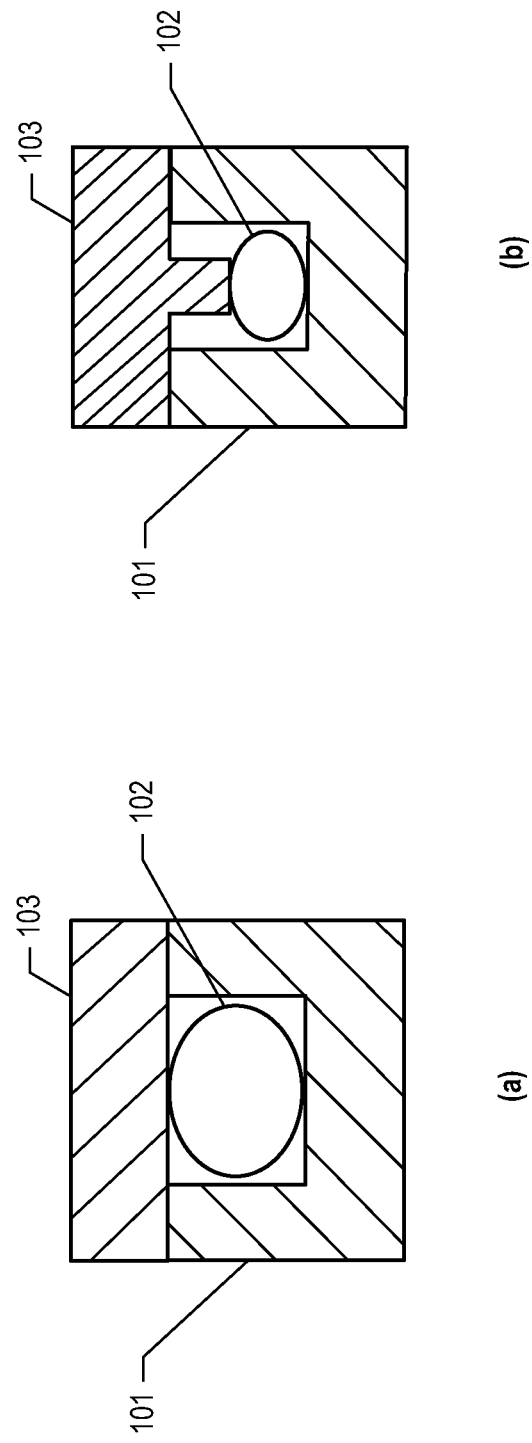
FIG. 5 depicts sectional views of two embodiments of top 103 that correspond to the two arrangements of FIG. 4, in accordance with the illustrative embodiment of the present invention.

In accordance with the illustrative embodiment, bladder 102 is filled with a mixture of propylene glycol and distilled water. This fluid is non-toxic to bees, and has been determined empirically to provide accurate pressure readings in the temperature range 0 to 60 degrees Celsius. As will be appreciated by those skilled in the art, some other embodiments of the present invention might employ a different fluid (e.g., a different mixture of liquids, a single liquid compound, a gaseous fluid, etc.), and it will be clear to those skilled in the art, after reading this disclosure, how to make and use such alternative embodiments. Further details concerning bladder 102 are described below and with respect to FIG. 5.

Figure 2:
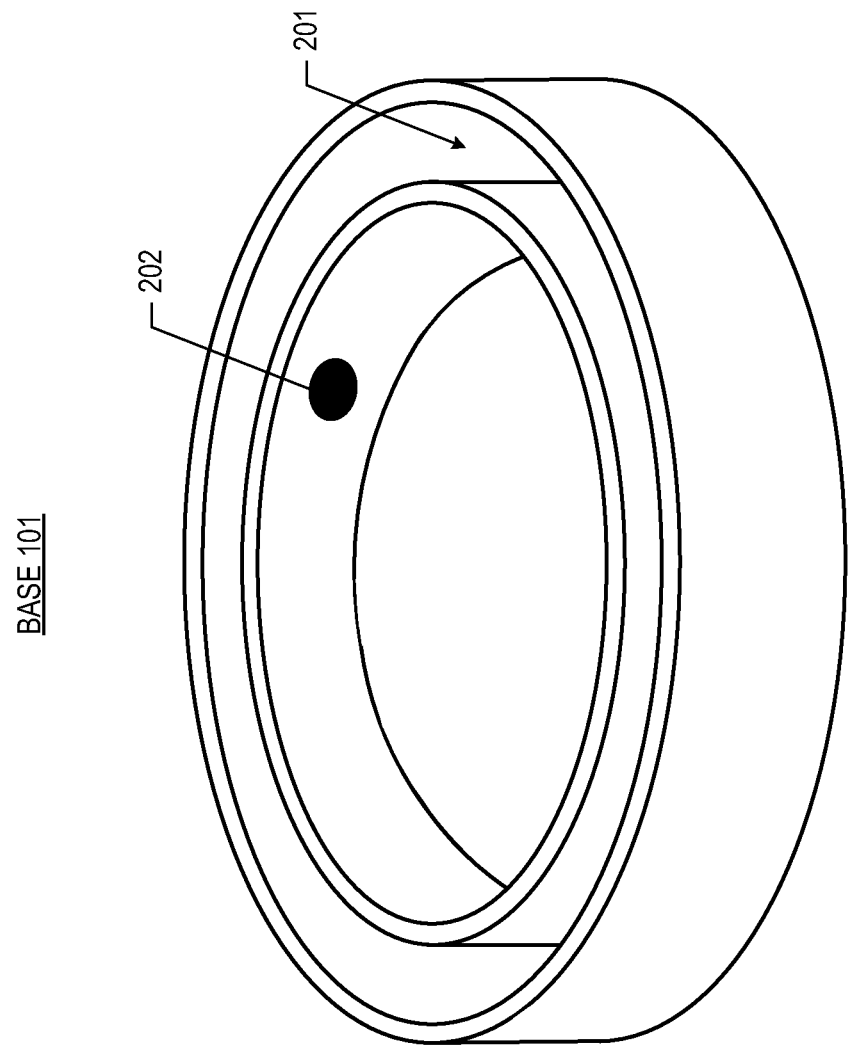
FIG. 2 depicts a close-up view of base 101, as shown in FIG. 1, in accordance with the illustrative embodiment of the present invention.

As shown in detail in FIG. 2, base 101 has a channel 201 in which bladder 102 rests, and an opening 202 through which pressure hose 104 is connected to bladder 102. In accordance with the illustrative embodiment, base 101 is constructed from wood; however, as will be appreciated by those skilled in the art, in some other embodiments, base 101 might be made from some other type of material, such as metal, plastic, a metal alloy, and so forth, and it will be clear to those skilled in the art, after reading this disclosure, how to make and use such alternative embodiments of base 101.

Figure 3:
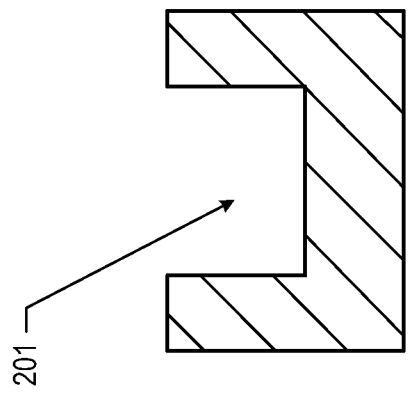
FIG. 3 depicts a sectional view of base 101, in accordance with the illustrative embodiment of the present invention.

FIG. 3 depicts a sectional view of base 101, in accordance with the illustrative embodiment of the present invention. As shown in FIG. 3, channel 201 does not descend entirely to the bottom of base 201. As will be appreciated by those skilled in the art, the roughly 50% ratio of the depth of channel 201 to the height of base 101 depicted in FIG. 3 is merely illustrative; in some other embodiments of the present invention this ratio might differ, and it will be clear to those skilled in the art, after reading this disclosure, how to make and use embodiments of base 101 with a different ratio.

FIGS. 4a and 4b depict sectional views of two possible arrangements of base 101 with bladder 102 inside channel 201, in accordance with the illustrative embodiment of the present invention. In the first arrangement of FIG. 4a, bladder 102 protrudes above the top of base 201, while in the second arrangement of FIG. 4b, bladder 102 sits entirely within channel 201.

As will be appreciated by those skilled in the art, the shapes shown in FIGS. 4a and 4b for bladder 102 are merely illustrative, and in some other embodiments of the present invention, bladder 102 might have some shape other than circular or elliptical (e.g., rectilinear, etc.). As will further be appreciated by those skilled in the art, the fact that there are gaps between bladder 102 and the walls of channel 102 in FIGS. 4a and 4b is also merely illustrative, and in some other embodiments of the present invention, bladder 102 might physically contact one or both walls of channel 201.

Figure 4:
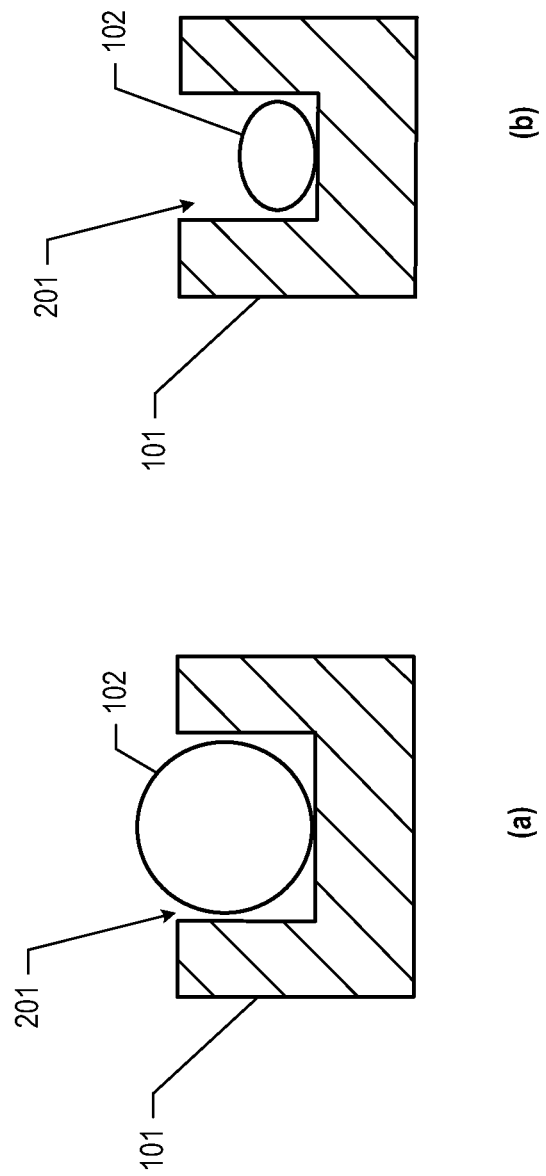
FIG. 4 depicts sectional views of two arrangements of base 101 with bladder 102 inside channel 201, as shown in FIG. 2, in accordance with the illustrative embodiment of the present invention.

FIGS. 5a and 5b depict sectional views of two embodiments of top 103 that correspond to the two arrangements of FIG. 4, in accordance with the illustrative embodiment of the present invention. In the first embodiment, depicted in FIG. 5a, top 103 is a solid, flat, ring-shaped piece of wood, such that when top 103 is placed on top of bladder 102 and a beehive (or other object) is placed on top 103:

(1) the beehive will exert a pressure on bladder 102 correlatable to the beehive's weight, and
(2) top 103 will lie stably on top of bladder 102 and base 101.

As will be appreciated by those skilled in the art, in some other embodiments of the present invention, top 103 depicted in FIG. 5a might be made from some other type of material, such as metal, plastic, a metal alloy, and so forth, and it will be clear to those skilled in the art, after reading this disclosure, how to make and use such alternative embodiments of top 103.

As will further be appreciated by those skilled in the art, in some embodiments of the present invention in which top 103 of FIG. 5a lies stably on top of bladder 102 and base 101, top 103 might lie flush with base 101, while in some other embodiments, there might be a small gap between top 103 and base 101. As will yet further be appreciated by those skilled in the art, in still other embodiments of the present invention, there might be a large gap between top 103 and base 101; such a gap might not provide the stability of the illustrative embodiment, but could work "well enough" for particular applications.

As will still further be appreciated by those skilled in the art, in some other embodiments of the present invention in which the arrangement of FIG. 4a is employed, top 103 might not be used in weight-monitoring system 100 at all, in which case the beehive (or other object) is placed directly on bladder 102. Such an arrangement might provide adequate stability for particular applications, particularly when bladder 102 has a flat, rather than a curved, top.

FIG. 5b depicts a second embodiment of top 103, corresponding to the second arrangement of base 101 and bladder 102 depicted in FIG. 4b. As shown in FIG. 5b, top 103 is flat on its top, but on its bottom has a protruding ring of smaller diameter that fits into channel 201 and physically contacts bladder 102 when top 103 is placed on top of base 101. As in the first embodiment of top 103 of FIG. 5a, when top 103 of FIG. 5b is placed on top of base 101 and a beehive (or other object) is placed on top 103:

(1) the beehive will exert a pressure on bladder 102 correlatable to the beehive's weight, and (2) top 103 will lie stably on base 101.

In accordance with the illustrative embodiment, top 103 depicted in FIG. 5b, like top 103 of FIG. 5a, is made of wood. As will be appreciated by those skilled in the art, in some other embodiments top 103 of FIG. 5b might be made from some other type of material, such as metal, plastic, a metal alloy, and so forth, and it will be clear to those skilled in the art, after reading this disclosure, how to make and use such alternative embodiments of top 103.

As will further be appreciated by those skilled in the art, in some embodiments of the present invention in which top 103 of FIG. 5b lies stably on top of base 101, top 103 might lie flush with base 101, while in some other embodiments, there might be a small gap between top 103 and base 101. As will yet further be appreciated by those skilled in the art, in still other embodiments of the present invention, there might be a large gap between top 103 and base 101; such a gap might not provide the stability of the illustrative embodiment, but could work "well enough" for particular applications.

Figure 6:
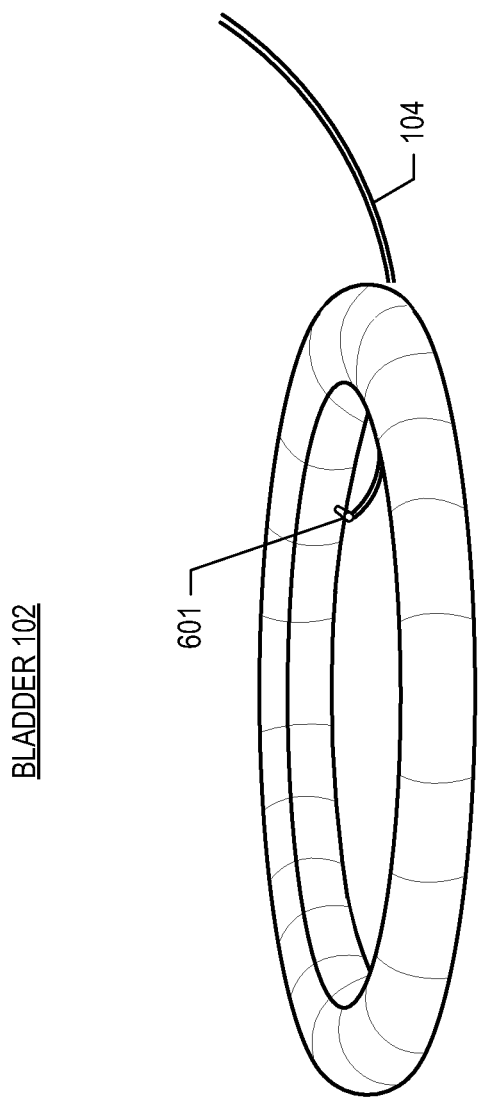
FIG. 6 depicts a close-up view of bladder 102, as shown in FIG. 1, in accordance with the illustrative embodiment of the present invention.

FIG. 6 depicts a close-up view of bladder 102, in accordance with the illustrative embodiment of the present invention. As shown in FIG. 6, bladder 102 has tube 601 that can be fitted through opening 202 of base 101, and by which pressure hose 104 can be connected to bladder 102. In accordance with the illustrative embodiment, tube 601 is the valve of bicycle-tire bladder 101, with the valve stem removed. As will be appreciated by those skilled in the art, in some other embodiments of the present invention, bladder 102 might have a different type of connection conduit to pressure hose 104 in lieu of tube 601, and it will be clear to those skilled in the art, after reading this disclosure, how to make and use such alternative embodiments of bladder 102.

In accordance with the illustrative embodiment, pressure hose 104 (see, e.g., FIG. 1) is a ¼-inch hydraulic hose made of rubber that fluidically couples tube 601 of bladder 102 to manifold 105. The pressure hose places the bladder 102 and manifold 105 in fluidic communication such that pressure changes or fluidic changes in the state of bladder 102 affect manifold 105. For example, in the illustrative embodiment, pressure hose 104 is capable of transferring fluid between bladder 102 and manifold 105 in response to pressure changes in the bladder. As will be appreciated by those skilled in the art, in some other embodiments of the present invention, pressure hose 104 might be made of some other material, and it will be clear to those skilled in the art, after reading this disclosure, how to make and use such alternative embodiments of pressure hose 104. As will be further appreciated by those skilled in the art, in yet other embodiments of the present invention, a conduit other than a pressure hose, might be used to connect bladder 102 to manifold 105 and transport fluid between them, and it will be clear to those skilled in the art, after reading this disclosure, how to make and use such a conduit in lieu of pressure hose 104.

In accordance with the illustrative embodiment, manifold 105 has an inflow pipe that connects to pressure hose 104, and three outflow pipes. As shown in FIG. 1, one of the outflow pipes is connected to pressure gauge 106, and another one of the outflow pipes is connected to pressure-monitoring system 107, in well-known fashion. In accordance with the illustrative embodiment, the third outflow pipe of manifold 105 is used for adding fluid to and evacuating fluid from pressure hose 104 and bladder 102.

In accordance with the illustrative embodiment, pressure gauge 106 is an analog pressure gauge that is capable of measuring pressure of gases and liquids. As will be appreciated by those skilled in the art, in some other embodiments of the present invention, a different type of pressure gauge might be employed, and it will be clear to those skilled in the art, after reading this disclosure, how to make and use embodiments of weight-monitoring system 100 that use such an alternative gauge.

Figure 7:
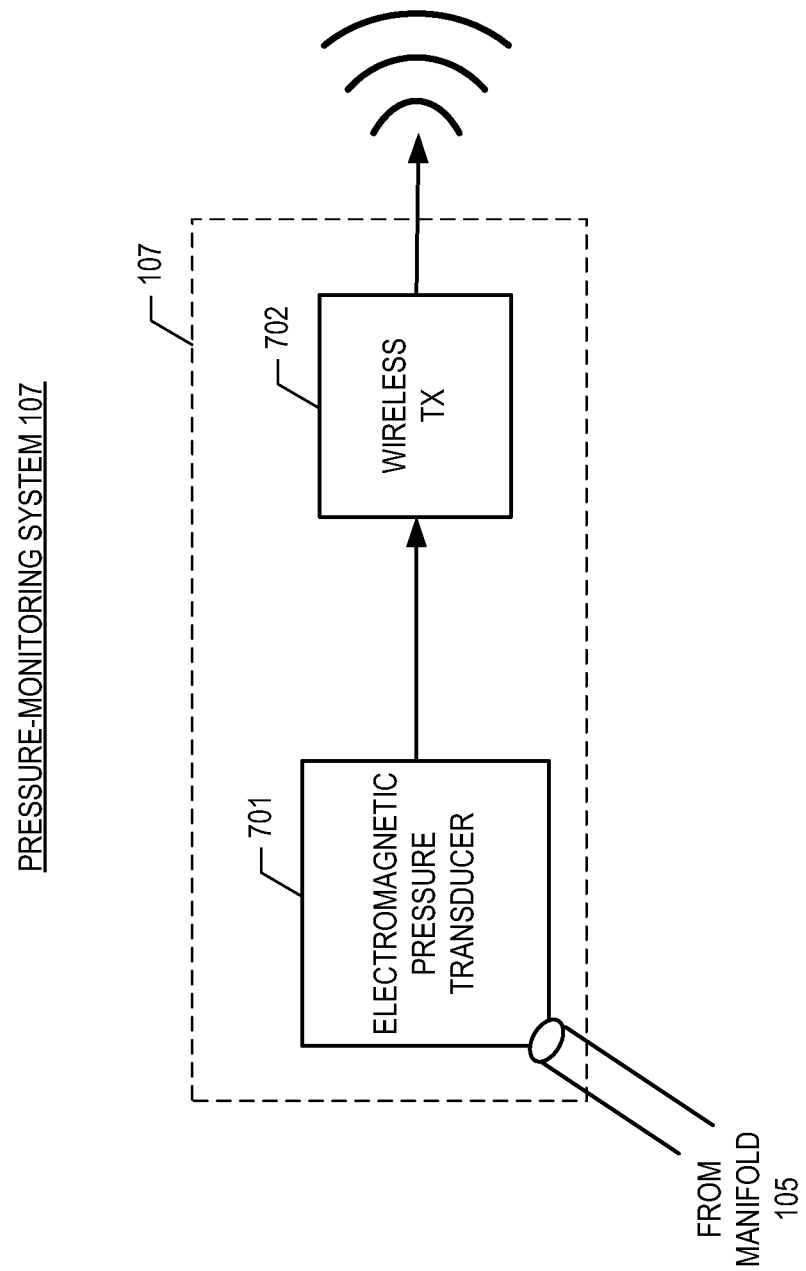
FIG. 7 depicts the salient elements of pressure-monitoring system 107, as shown in FIG. 1, in accordance with the illustrative embodiment of the present invention.

FIG. 7 depicts the salient elements of pressure-monitoring system 107, in accordance with the illustrative embodiment of the present invention. As shown in FIG. 7, pressure-monitoring system 107 comprises electromagnetic pressure transducer 701 and wireless transmitter 702, interconnected as shown.

Electromagnetic pressure transducer 701 converts fluid pressure from manifold 105 into a voltage that is correlatable to the fluid pressure, and outputs a digital representation of the magnitude of the voltage, in well-known fashion.

Wireless transmitter 702 receives the output of electromagnetic pressure transducer 701 and transmits this information to a computer (not depicted in the figures) in accordance with an Institute of Electrical and Electronics Engineers 802.11 ("Wi-Fi") protocol (e.g., 802.11g, 802.11n, etc.), in well-known fashion. In accordance with the illustrative embodiment, the computer is programmed to record the data received from wireless transmitter 702, and to issue notifications or alerts based on a set of rules (e.g., issue an alert when the weight changes by more than a certain percentage over a given time interval, etc.).

As will further be appreciated by those skilled in the art, in some other embodiments of the present invention, pressure-monitoring system 107 might comprise only electromagnetic pressure transducer 701, or might have other elements in addition to, or instead of, those of the illustrative embodiment, and it will be clear to those skilled in the art, after reading this disclosure, how to make and use such alternative embodiments of pressure-monitoring system 107. For example, in some other embodiments of the present invention, pressure-monitoring system 107 might comprise additional elements related to the transmission and/or processing of the pressure measurements, such as a TCP/IP network interface card, a microprocessor, etc.

As will further be appreciated by those skilled in the art, in some other embodiments of the present invention, wireless transmitter 702 might be a simple frequency modulation (FM) transmitter, rather than an IEEE 802.11-compliant transceiver. In yet other embodiments of the present invention, transmitter 702 might be a wireline transmitter, rather than a wireless transmitter (e.g., a wired Ethernet transceiver, etc.). In either case, it will be clear to those skilled in the art, after reading this disclosure, how to make and use such alternative embodiments of the present invention.

As will yet further be appreciated by those skilled in the art, some other embodiments of the present invention might employ only one of pressure gauge 106 and pressure-monitoring system 107, rather than both, and it will be clear to those skilled in the art, after reading this disclosure, how to make and use such alternative embodiments.

As will yet further be appreciated by those skilled in the art, some other embodiments of the present invention might employ a different shape for the top/bladder/base (e.g., an elliptical shape, the perimeter of a triangle, the perimeter of a square, the perimeter of a rectangle, etc.) that, like a ring, enables access to a central portion of the bottom of the beehive (or other object) being monitored, and it will be clear to those skilled in the art, after reading this disclosure, how to make and use such alternative embodiments.

As will yet further be appreciated by those skilled in the art, in some other embodiments of the present invention, fluid might reside directly in channel 201, without using bladder 102; in such embodiments, top 103 might comprise one or more elements (e.g., a squeegee, etc.) to contain the fluid. Alternatively, some other embodiments of the present invention might use a semi-solid material instead of fluid in channel 201.

As will still further be appreciated by those skilled in the art, some other embodiments of the present invention might employ a different weight-detection mechanism instead of, or in addition to, bladder 102, pressure gauge 106, and pressure-monitoring system 107. For example, in some other embodiments of the present invention, one or more load cells, or a pressure-sensitive "smart fabric" whose electrical resistance varies with pressure, or both, might be employed instead of, or in addition to, bladder 102 (for example, the load cells or smart fabric could be sandwiched between top 103 and base 101, in convenient fashion). As will be appreciated by those skilled in the art, such alternative weight-detection mechanisms preserve the myriad advantages of the present invention for continuous monitoring of beehives (e.g., unobstructed access to the area below the bottom board of the beehive, waste produced in the beehive is free to fall through a screened bottom board and exit the beehive, improved ventilation into and out of the beehive through a screened bottom board, ability to deploy sensors such as video cameras and microphones below the screened bottom board and unobtrusively monitor the inside of the beehive, providing a level and stable platform, etc.), and it will be clear to those skilled in the art, after reading this disclosure, how to make and use such alternative embodiments of the present invention.

Figure 8:
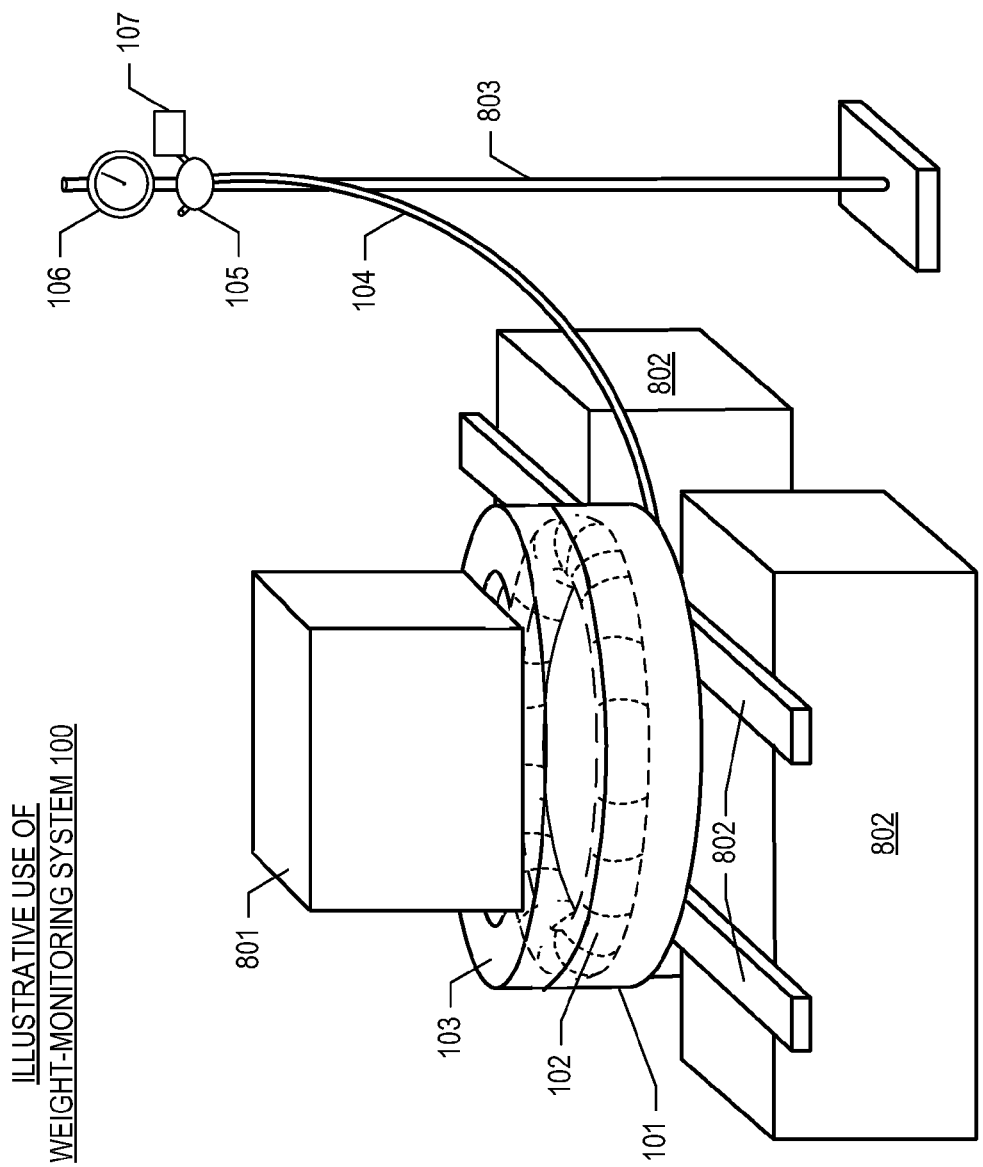
FIG. 8 depicts an illustrative use of weight-monitoring system 100 in an apiary, in accordance with the illustrative embodiment of the present invention.

FIG. 8 depicts an illustrative use of weight-monitoring system 100 in an apiary, in accordance with the illustrative embodiment of the present invention. FIG. 8 depicts beehive 801 sitting on top 103, and base 101 sitting on stand 802. As shown in FIG. 8, stand 802 is arranged so that the benefits of weight-monitoring system 100 (e.g., access to the bottom of beehive 801, improved ventilation, stability, the freedom of waste in beehive 801 to fall through a screened bottom board, etc.) are maintained.

Also shown in FIG. 8 is pole 803, to which manifold 105 is attached. In accordance with the illustrative embodiment, manifold 105 is attached to pole 803 via a clip that enables sliding of manifold 105 up and down pole 803. This arrangement enables convenient "tareing" of weight-monitoring system 100, as the height of manifold 105 on pole 803 can be adjusted to yield a desired pressure reading for pressure gauge 106 and pressure-monitoring system 107. In addition, the attachment of manifold 105 to pole 803 facilitates the adding of fluid to weight-monitoring system 100 via the manifold's free outflow pipe.

As will be appreciated by those skilled in the art, there are a variety of ways, other than that of the illustrative embodiment as depicted in FIG. 8, to deploy and use weight-monitoring system 100, and it will be clear to those skilled in the art, after reading this disclosure, how to realize such alternative uses and deployments.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An apparatus for continuously monitoring the weight of a beehive, said apparatus comprising:
   a surface for stably supporting said beehive, wherein a marginal portion of a bottom of said beehive is disposed on said surface and a central portion of the bottom of said beehive is not disposed on said surface;
   a fluid-filled bladder on which said surface is disposed;
   a base that comprises a channel in which said bladder is disposed; and
   pressure-measuring means connected to said bladder, wherein a change in pressure measured by the pressure-measuring means is correlatable to a change in the weight of said beehive;
   wherein said apparatus is physically configured to enable waste produced in said beehive to exit said beehive during the continuous monitoring.

2. The apparatus of claim 1 wherein said surface, said bladder, and said base have a ring shape.

3. The apparatus of claim 1 wherein said apparatus is physically configured to enable access to the bottom of said beehive during the continuous monitoring.

4. The apparatus of claim 1 wherein said beehive has a screened bottom board, and wherein said apparatus is physically configured to enable one or more gases to flow into and out of the bottom of said beehive through said screened bottom board during the continuous monitoring.

5. The apparatus of claim 1 wherein the pressure-measuring means comprises one or both of a pressure gauge and an electromagnetic pressure transducer.

6. The apparatus of claim 1 wherein said apparatus is physically configured to keep said beehive level during the continuous monitoring.

7. An apparatus for continuously monitoring the weight of a beehive, said apparatus comprising:
   a fluid-filled bladder, wherein a marginal portion of a bottom of said beehive is disposed on said bladder and a central portion of the bottom of said beehive is not disposed on said bladder; and
   pressure-measuring means connected to said bladder, wherein a change in pressure measured by the pressure-measuring means is correlatable to a change in the weight of said beehive;
   wherein said apparatus is physically configured to enable waste produced in said beehive to exit said beehive during the continuous monitoring.

8. The apparatus of claim 7 wherein said bladder has a ring shape.

9. The apparatus of claim 7 wherein said beehive has a screened bottom board, and wherein said apparatus is physically configured to enable visibility into the inside of said beehive through said screened bottom board during the continuous monitoring.

10. The apparatus of claim 7 wherein said beehive has a screened bottom board, and wherein said apparatus is physically configured to enable unobstructed deployment of a microphone underneath said screened bottom board during the continuous monitoring.

* * * * *